United States Patent [19]

Gee et al.

[11] 4,060,289
[45] Nov. 29, 1977

[54] BEARING ASSEMBLY FOR AN AUGER SCRAPER

[75] Inventors: James Edgar Gee, Washington; Edward Joseph Ohms, Decatur, both of Ill.

[73] Assignee: Caterpillar Tractor Co., Peoria, Ill.

[21] Appl. No.: 628,022

[22] Filed: Nov. 3, 1975

[51] Int. Cl.[2] .......................... F16C 19/38; E02F 3/62
[52] U.S. Cl. ..................................... 308/187.1; 37/8; 308/19; 308/208
[58] Field of Search ................ 37/8, 4, 126, 129, 108; 214/83, 32; 198/213; 308/181, 174, 19, 229-231, 187.1, 207 R, 208

[56] References Cited

U.S. PATENT DOCUMENTS

| 2,410,927 | 11/1946 | Callahan et al. | 308/19 |
|---|---|---|---|
| 3,857,190 | 12/1974 | Gee et al. | 37/8 |
| 3,863,367 | 2/1975 | Gee et al. | 37/8 |
| 3,964,552 | 6/1976 | Slator | 308/207 A |

Primary Examiner—Richard A. Bertsch

Attorney, Agent, or Firm—Wegner, Stellman, McCord, Wiles & Wood

[57] ABSTRACT

A scraper which has a bowl provided with an upright auger has a bottom bearing assembly on the bowl floor which supports the auger. The bearing assembly has a fixed lower housing with a stepped cavity containing bearings, and an upper housing rotatably carried in the bearings that has a through bore affording a lubricant chamber. The lower and upper housings have confronting external flanges between which is a metal-to-metal lubricant seal having elastomeric rings that must be compressed to make the seal effective. The bearing assembly includes surface engaging preload means in the through bore to depress the upper housing and thus compress the elastomeric rings, after which a cover plate is fastened on the top of the upper housing member and the lower end of the auger shaft is seated on a mating square stub on the cover plate. The weight of the auger further depresses the upper housing to disengage the surfaces of the preload means.

12 Claims, 3 Drawing Figures

BEARING ASSEMBLY FOR AN AUGER SCRAPER

BACKGROUND OF THE INVENTION

Self-loading scrapers which are provided with a generally upright auger near the cutting edge of the scraper bowl are well known as disclosed in U.S. Pat. Nos. 3,857,190, 3,863,367, and a number of earlier patents. The auger helps to prevent jamming of material in the front of the bowl by moving some of it upwardly so that it may fall behind the auger. Such augers commonly have a shaft mounted in a bearing at the bottom of the bowl, while there is a driving connection between the upper end of the auger shaft and an auger drive means which is mounted upon a cross beam at the top of the bowl as disclosed in said U.S. Pat. No. 3,863,367.

The bearing structure which is in the bottom of a self-loading scraper bowl must be capable of functioning in an enviornment where it is constantly submerged in earth of varying degrees of fineness, and where it may be subjected to substantial impact of large rocks and the like. Accordingly, it must be extra-ordinarily well sealed against dirt which could damage the bearings; and it must be of a very rugged construction.

At the same time, installation of a complete auger assembly must be relatively simple, and must permit ready access to various parts of the assembly for purposes of repair or replacement.

The most dirt-proof lubricant seals are metal-to-metal seals of the general type disclosed in U.S. Pat. No. 3,180,648, and such seals are ineffective until a pair of elastomeric rings have been sufficiently compressed to bring the mating faces of the metal sealing rings into contact with one another. The loading of an annular seal, such as that of U.S. Pat. No. 3,180,648, requires rather uniform application of force throughout the circumference of the seal means, and this cannot be accomplished with any degree of certainty during mounting of an auger upon such a bearing structure.

SUMMARY OF THE INVENTION

The principal object of the present invention is to provide simple and effective means for preloading the rotatable upper bearing housing of the supporting bearing assembly for the auger of an auger scraper so as to compress the annular elastomeric members which form a part of a metal-to-metal lubricant seal used between said rotatable bearing housing and a fixed bearing housing in which it is journalled.

Another object of the invention is to provide a supporting bearing assembly for the auger of an auger scraper which depresses the rotatable upper bearing housing by a controlled amount which is sufficient to render the metal-to-metal annular seal effective, but which still allows for further compression of the elastomeric rings of the metal-to-metal sealing means under the weight of the auger.

Still another object of the invention is to provide a supporting bearing assembly for such an auger in which the upper bearing housing is hollow to provide a lubricant chamber for the bearings of the supporting bearing assembly, and to provide means for replenishing the supply of lubricant in the chamber without disassembling the supporting bearing assembly.

THE DRAWINGS

DETAILED DESCRIPTION OF THE INVENTION

Figure 1:
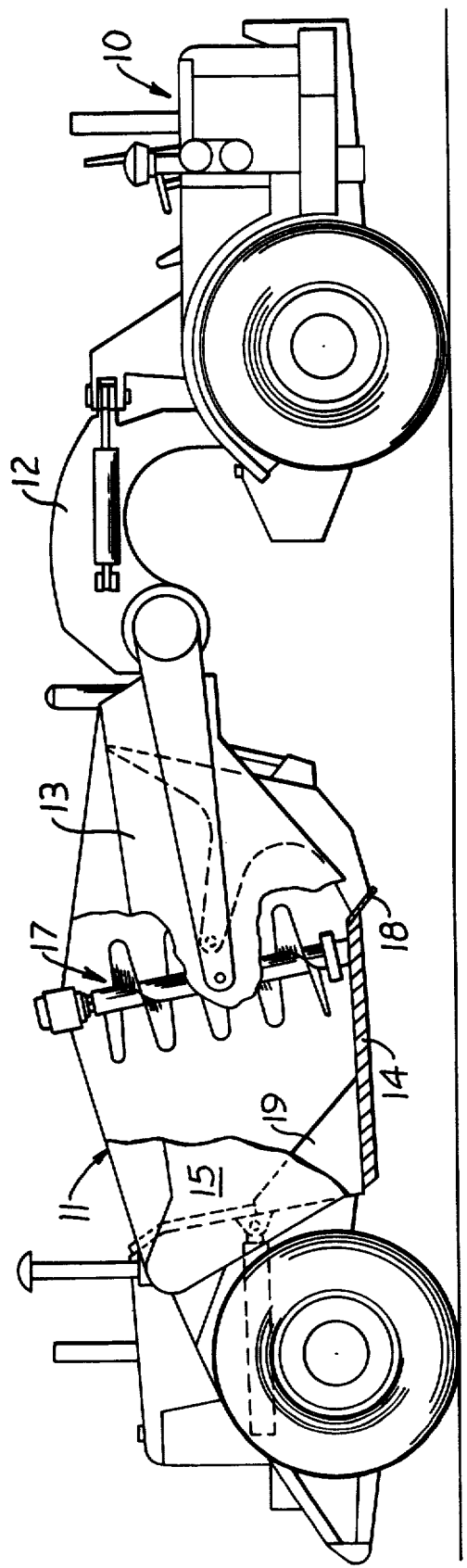
FIG. 1 is a side elevational view of a self-loading auger scraper with a part of a sidewall broken away to show the auger.

Referring to FIG. 1, a self-loading auger scraper includes a tractor, indicated generally at 10, and a scraper, indicated generally at 11, which is articulately connected to the tractor by conventional gooseneck means 12. The scraper 11 includes a bowl 13 having a floor 14 and sidewalls 15, and a cross beam 16 between the upper ends of the sidewalls cooperates with the bowl floor 14 in mounting an auger assembly, which is indicated generally at 17 and has its lower end close to a forward cutting edge 18 of the bowl. The scraper is illustrated as provided with ejector means, indicated generally at 19, of the type disclosed and claimed in U.S. Pat. No. 3,863,367.

Figure 2:
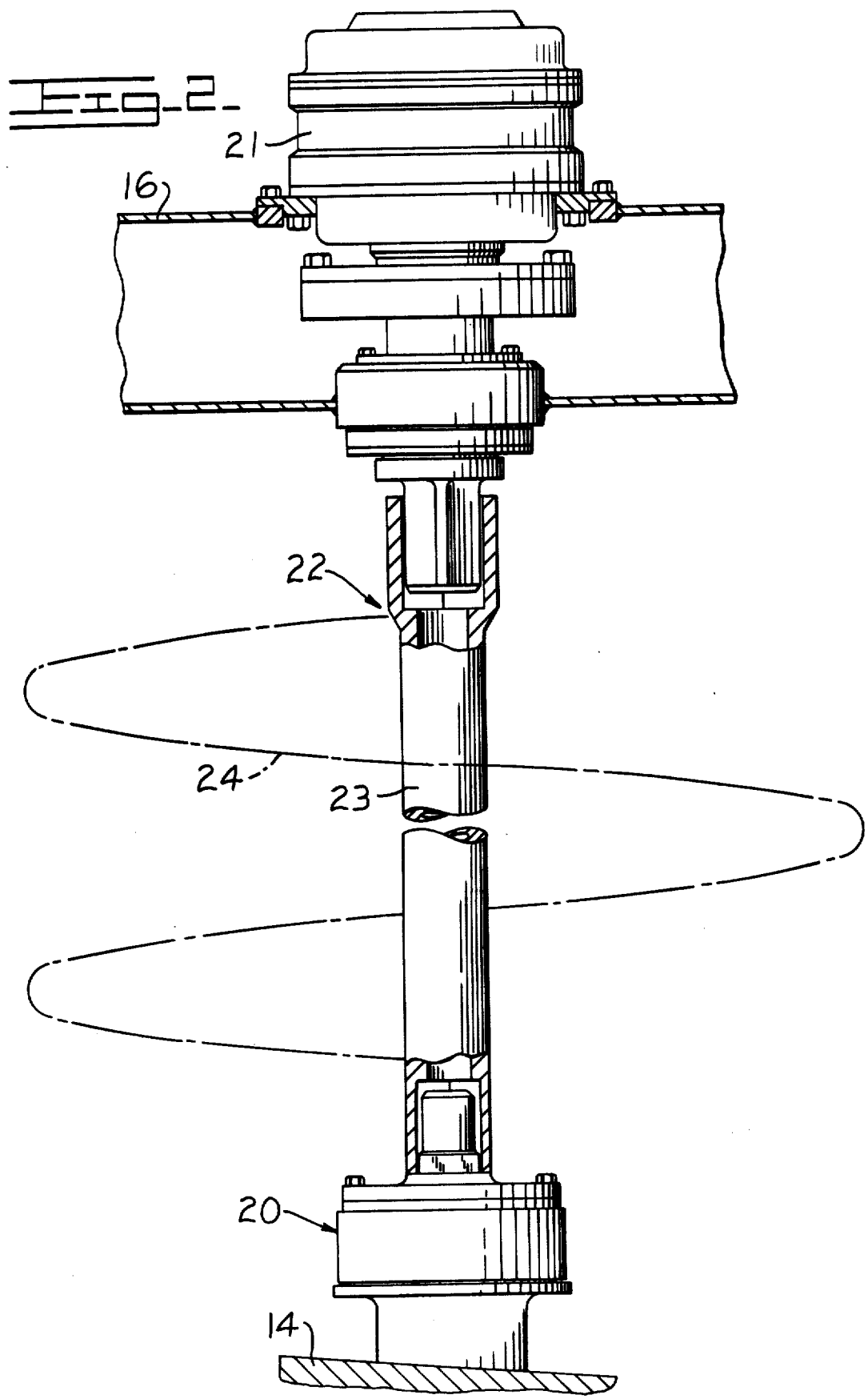
FIG. 2 is a side elevational view on an enlarged scale, with parts in section, illustrating the auger assembly.

Referring now to FIG. 2, the auger assembly 17 consists generally of a supporting bearing assembly, indicated generally at 20, which is secured to the bowl floor 14; auger drive means 21 which is mounted upon the top cross beam 16; and an auger, indicated generally at 22, which includes a shaft 23 and the usual helical auger flight 24.

Figure 3:
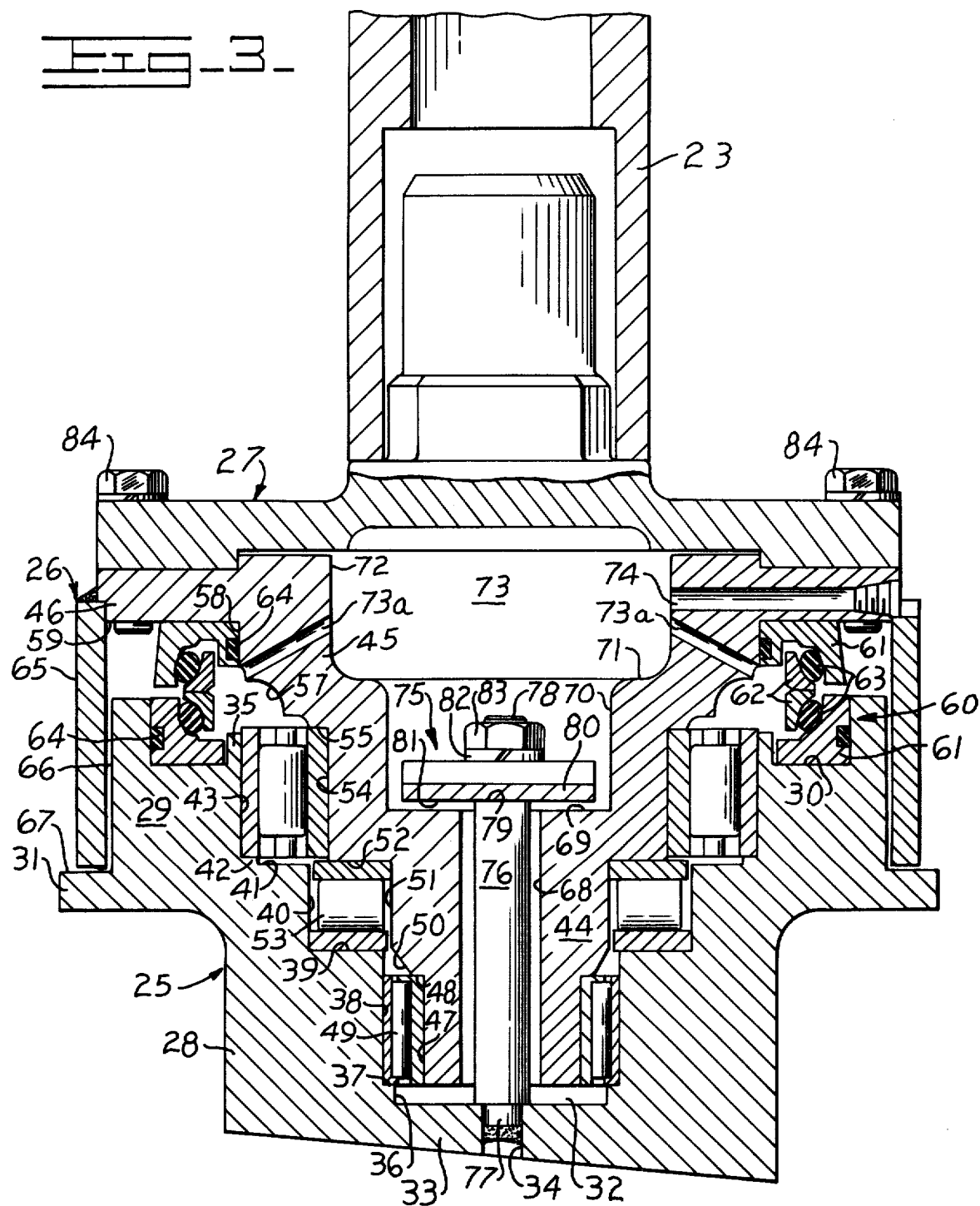
FIG. 3 is a fragmentary vertical sectional view on an enlarged scale to show the structure of the supporting bearing assembly for the auger.

Referring now to FIG. 3, the supporting bearing assembly 20 is seen to consist generally of a fixed lower bearing housing 25, a rotatable upper bearing housing 26, and a cover plate 27, for the rotatable upper bearing housing.

The lower bearing housing 25 has a base portion 28 and an external, annular top flange 29 the top surface of which is formed to provide a continuous channel 30. At the lower margin of the annular top flange 29 is a continuous, radially projecting web 31.

Internally, the lower bearing housing 25 has a stepped cavity 32 which has a bottom wall 33 at the center of which is an axial bore 34 which extends nearly to the bottom surface of the base portion 28. The sidewall of the cavity 32 is formed in a series of annular steps so that it is of progressively increasing diameter from its bottom wall 33 to an upstanding circumferential web 35 which defines the inner wall of the channel 30, and the upper end of which defines the upper end of the cavity 32. The steps between the bottom wall 33 and the upstanding web 35 include a lowermost riser 36 that terminates at a transverse surface 37, a lower intermediate riser 38 which terminates in an intermediate transverse surface 39, an upper intermediate riser 40 which terminates in a transverse surface 41 at the outer periphery of which is a very shallow step 42 from which a cavity upper wall 43 extends upwardly and defines the inner surface of the upstanding web 35.

The rotatable upper bearing housing 26 has an externally and internally stepped bottom portion 44, the external steps of which are generally complementary to the internal steps of the lower housing cavity 32, and which cooperate with the risers and transverse surfaces of said cavity to define bearing raceways. The bottom portion 44 of the rotatable upper housing member is surmounted by an integral annular upper portion 45 which is surrounded by an external, annular upper flange 46 that confronts the top flange 29 when the upper and lower housing portions are assembled.

Specifically, the bottom portion 44 of the upper housing has a lowermost upright outer surface 47 which terminates in a transverse overhang 48. The surfaces 47 and 48 cooperate with the transverse surface 37 and the lower intermediate riser 38 to define a raceway for a roller bearing set 49. Above the overhang 48 is an inclined clearance surface 50 which merges into an intermediate upright outer surface 51 that terminates at an intermediate lateral overhang 52. The surface 51 and the overhang 52 cooperate with the riser 40 and the transverse surface 39 to define a raceway for a set of thrust bearings 53.

At the outer margin of the overhang 52 is an uppermost, external upright surface 54 which terminates in a top overhang 55, and the surface 54 and overhang 55 cooperate with the cavity upper wall 43 and the shallow step 42 to provide a raceway for an upper bearing assembly 56 which is supported clear of the transverse surface 41 and the thrust bearing 53 by the shallow step 42. From the outer margin of the overhang 55 an arcuate clearance surface 57 extends outwardly and upwardly; and the overhanging upper portion 45 of the rotatable housing is spaced a substantial distance above the bearing assembly 56.

An outer upright surface 58 of the rotatable housing uppper portion 45 cooperates with the bottom surface 59 of the upper flange 46 and with the channel 30 in the upper surface of the lower housing top flange 29 to receive an annular metal-to-metal seal structure, indicated generally at 60. The seal structure 60 is of the type disclosed in U.S. Pat. No. 3,180,648, owned by applicant's assignee. For purposes of the present disclosure it is sufficient to state that it consists of a pair of mounting shells 61, a pair of metal rings 62 which are in face abutting engagement to make the seal, and a pair of elastomeric rings 63 which are positioned between the shells 61 and the metal rings 62. The required metal-to-metal contact of the rings 62 may by obtained only be a downward force exerted upon the upper mounting shell 61 which compresses the elastomeric rings 63. The mounting shells 61 of the metal-to-metal seal assembly 60 are provided with recesses to receive O-ring seals 64.

At the outer periphery of the upper flange 46 is a depending annular skirt 65 which has a very small clearance from the outer surface 66 of the lower housing flange 29 and from the top surface 67 of the projecting web 31, so as to form a labyrinth seal with said surfaces.

The stepped interior of the upper housing member is a through bore which has a long, relatively small diameter lowermost bore portion 68 which terminates at a step that defines a transverse surface 69, and said transverse surface 69 terminates in another upright surface 70 at the top of which another transverse surface 71 defines the top of the upper housing bottom portion; and said transverse surface 71 cooperates with an upright inner surface 72 of the upper housing upper portion 45 to define a lubricant chamber 73 which communicates with the raceways through bores 73a. Initially the chamber 73 may be filled with lubricant before the cover plate 27 is secured in place; and in order to permit replenishment of the lubricant in the chamber 73 there is a lubricant fitting seated in the outer end of a bore 74 which extends through the upper flange 46.

A preloading means, indicated generally at 75, permits the rotatable upper bearing housing 26 to be depressed so as to compress the elastomeric rings of the seal 60 and render the seal effective before the bearing cover plate 27 is mounted and the auger 22 is put in position. The preloading means 75 includes a post 76 which has a reduced lower end portion 77 which seats in the axial bore 34 at the bottom of the lower housing cavity 32 and is welded therein. The post 76 has a reduced upper end portion 78 which is threaded, and at the lower end of the reduced, threaded portion 78 is a peripheral shoulder 79 which is in a plane very slightly above that of the transverse surface 69 when the entire auger assembly is complete with the auger 22 supported upon the bearing cover plate 27. When the upper bearing housing member 26 is resting loosely upon the annular sealing means 60 the transverse surface 69 is somewhat above the level of the shoulder 79.

The preloading means 75 also includes a flange means in the form of a disc 80 which loosely embraces the threaded upper end 78 of the post and has its bottom surface 81 resting loosely upon the transverse surface 69. Finally, the preloading means 75 also includes a washer 82 which rests on the disc 80, and a threaded nut 83 which screws onto the threaded upper end portion 78 of the post and thus serves as force multiplying means. Thus, by screwing the nut 83 down the disc 80 applies a force against the transverse surface 69 to depress the upper bearing housing 26 until the downward movement of the disc is arrested by contact with the shoulder 79 on the post 76.

After preloading of the upper housing member 26 the chamber 73 may be packed with lubricant which serves to replenish lubricant previously packed into the bearings 49, 53 and 56, and the cover plate 27 is secured in place by means of a plurality of bolts such as the bolt 84.

The auger 22 has the bottom of its shaft 23 resting upon a boss which surrounds a square stub which is non-rotatably engaged by a square socket in the bottom of the auger shaft 23, and a square socket in the top of the auger shaft 23 non-rotatably engages a square drive shaft at the bottom of the drive means 21. Initial assembly, of course, requires that the bottom of the auger shaft be seated upon the cover plate 27 with the auger 22 stably supported until the drive means 21 may be brought into driving engagement with the upper end of the auger shaft 23 and the drive means may be secured to the top cross beam 16. The weight of the auger 22 resting upon the upper housing member 26 further depresses said housing member to separate the transverse surface 69 from the under surface 81 of the disc 80 to permit free rotation of the upper housing member.

The foregoing detailed description is given for clearness of understanding only and no unnecessary limitations should be understood therefrom, as modifications will be obvious to those skilled in the art.

What is claimed is:

1. A bearing assembly for rotatably supporting the lower end of an auger adjacent the floor of a self-loading auger scraper bowl, said assembly comprising, in combination:

a lower, fixed housing member mounted adjacent the bowl floor, said fixed housing member having a stepped cylindrical cavity and an external, annular top flange;

bearing means in said cavity;

an upper housing member rotatably carried on said bearing means, said upper housing member having an external annular upper flange confronting said top flange;

means surmounting said upper housing which is adapted to receive the lower end of an auger shaft;

annular lubricant seal means mounted between said annular flanges, said seal means including elastomeric ring means which must be compressed to make said seal means effective;

and means for preloading said upper housing member to compress said elastomeric ring means, said preloading means comprising fixed means secured to the lower housing member, and force multiplying means engageable with said fixed means, said force multiplying means including flange means which bears upon a transverse surface of the upper housing to depress said upper housing and thereby force said upper flange against the seal means, said upper housing member being further depressed by the weight of the auger to separate said transverse surface from said flange means.

2. The combination of claim 1 in which the upper housing member has a through bore which includes a step that provides said transverse surface, the fixed means is axially aligned with said through bore, the force multiplying means threadedly engages the fixed means, and the flange means is a disc bearing upon said transverse surface.

3. The combination of claim 2 in which the upper housing member has an open upper end, and the means surmounting said upper end consists of a cover plate which receives the lower end of the auger shaft.

4. The combination of claim 2 in which the fixed means is an upstanding threaded post, the disc loosely embraces the upper end portion of the post, and the force multiplying means is a threaded nut engaging the threaded post.

5. The combination of claim 2 in which the post has a reduced, threaded upper end portion defining a peripheral shoulder, and the disc seats on said shoulder to limit the depression of the upper housing member by the preloading means.

6. The combination of claim 1 in which the means for preloading the upper housing member includes interengaging means to limit the depression of the upper housing member by the preloading means.

7. The combination of claim 1 which includes labyrinth seal means surrounding said annular seal means.

8. The combination of claim 1 in which the upper housing member is hollow to provide a lubricant chamber, and means are provided for injecting lubricant into said chamber through a wall of said chamber.

9. The combination of claim 8 in which the upper housing member has an open upper end, and the means surmounting said upper end consists of a cover plate which receives the lower end of the auger shaft.

10. The combination of claim 9 in which the hollow upper housing member has a through bore which includes a step that provides said transverse surface, the fixed means is axially aligned with said through bore, the force multiplying means threadedly engages the fixed means, and the flange means is a disc bearing upon said transverse surface.

11. The combination of claim 10 in which the fixed means is an upstanding post which has a reduced, threaded upper end portion defining a peripheral shoulder, the force multiplying means is a threaded nut engaging the threaded upper end portion, and the disc is seated on said shoulder beneath the nut, the shoulder serving to limit the depression of the upper housing member by the preloading means.

12. The combination of claim 1 in which the fixed housing member is fixedly secured to the bowl floor.

* * * * *